United States Patent
Motoyama

(10) Patent No.: US 8,213,045 B2
(45) Date of Patent: Jul. 3, 2012

(54) CORRECTION OF IMAGE DATA SCALING IN SCREEN AREA

(75) Inventor: Hajime Motoyama, Moriya (JP)

(73) Assignee: Canon Kabushiki Kaisha (JP)

( * ) Notice: Subject to any disclaimer, the term of this patent is extended or adjusted under 35 U.S.C. 154(b) by 1066 days.

(21) Appl. No.: 12/131,337

(22) Filed: Jun. 2, 2008

(65) Prior Publication Data
US 2008/0297810 A1 Dec. 4, 2008

(30) Foreign Application Priority Data
Jun. 4, 2007 (JP) .................... 2007-148617

(51) Int. Cl.
*G06K 15/02* (2006.01)
(52) U.S. Cl. ............ 358/1.2; 358/1.9; 358/3.07
(58) Field of Classification Search .......... 358/1.1, 358/1.2, 1.9, 3.06, 3.07, 3.13; 382/298
See application file for complete search history.

(56) References Cited

U.S. PATENT DOCUMENTS
5,771,105 A * 6/1998 Rust et al. ............... 358/2.99

FOREIGN PATENT DOCUMENTS
JP 2004-351908 A 12/2004
* cited by examiner

*Primary Examiner* — Thomas D Lee
(74) *Attorney, Agent, or Firm* — Rossi, Kimms & McDowell LLP

(57) ABSTRACT

An image forming apparatus comprises a scaling correction circuit that corrects scaling in a sub-scanning direction of image data according to scaling data, a screen processing circuit that, of image data whose scaling in the sub-scanning direction has been corrected by the scaling correction circuit, performs screen processing on image data included in a screen area; and an image forming unit that forms an image based on the image data that has been processed by the screen processing circuit. The scaling correction circuit changes the scaling in the sub-scanning direction such that a pixel arrangement of the screen area after the scaling is changed becomes a pixel arrangement of image data before the scaling was changed.

8 Claims, 8 Drawing Sheets

FIG. 5

| 5 | 4 | 3 | 7 | 8 | 9 | 10 | 6 | 1 |
|---|---|---|---|---|---|---|---|---|
| 8 | 9 | 10 | 6 | 1 | 2 | 11 | 5 | 4 |
| 1 | 2 | 11 | 5 | 4 | 3 | 7 | 8 | 9 |
| 4 | 3 | 7 | 8 | 9 | 10 | 6 | 1 | 2 |
| 9 | 10 | 6 | 1 | 2 | 11 | 5 | 4 | 3 |
| 2 | 11 | 5 | 4 | 3 | 7 | 8 | 9 | 10 |
| 3 | 7 | 8 | 9 | 10 | 6 | 1 | 2 | 11 |
| 10 | 6 | 1 | 2 | 11 | 5 | 4 | 3 | 7 |
| 11 | 5 | 4 | 3 | 7 | 8 | 9 | 10 | 6 |
| 7 | 8 | 9 | 10 | 6 | 1 | 2 | 11 | 5 |
| 6 | 1 | 2 | 11 | 5 | 4 | 3 | 7 | 8 |
| 5 | 4 | 3 | 7 | 8 | 9 | 10 | 6 | 1 |
| 8 | 9 | 10 | 6 | 1 | 2 | 11 | 5 | 4 |
| 1 | 2 | 11 | 5 | 4 | 3 | 7 | 8 | 9 |

LINE INSERTION

310

CORRECTION OF IMAGE DATA SCALING IN SCREEN AREA

BACKGROUND OF THE INVENTION

1. Field of the Invention

The present invention relates to an image forming apparatus that forms an image based on image data, and a control method thereof.

2. Description of the Related Art

Ordinarily, in a printer employing an electrophotographic method used in a laser beam printer, a digital copy machine, or the like, the surface of a photosensitive drum is raster-scanned with a laser beam that has been modulated based on an image signal to form an electrostatic latent image, and that latent image is developed and transferred to a recording paper (sheet).

In a printer capable of printing on both faces of a sheet, when an image is formed on the front face of a sheet and fixed by applying heat, due to a change in the amount of moisture included in the sheet, the size of the sheet contracts or expands. When, in this state, an image is formed and fixed on the back face of the sheet. In such way, the sheet on which the double-sided printing is performed is discharged from the printer and the amount of moisture of the sheet has returned to its original state, the size of the image formed on the back face differs from the size of the image formed on the front face, so there is the problem that scaling is not the same for the image on the front face and the image on the back face.

To address this problem, a method has been proposed for appropriately correcting the scaling in a main scanning direction, which is the direction in which the laser beam scans, and the lengthwise direction of the photosensitive drum. In this method, an image signal is modulated to pixel data in which the image signal is divided in pixel units into a plurality of bits arranged in the main scanning direction of the laser beam, and one or more correction points (pixels) on one line are determined. The last bit of segmentation-modulated pixel data of a pixel positioned before the correction point is added as the first bit of segmentation-modulated pixel data of a pixel positioned at the correction point. Then, segmentation-modulated pixel data of successive pixels relative to each pixel positioned at and after the correction point is moved to the next pixel in bit units (see Japanese Patent Application Laid-open No. 2004-35190).

However, the method in the above conventional example is appropriate for correcting the scaling in the main scanning direction but it is not suitable for correcting the scaling in a sub-scanning direction. That is, in order to perform segmentation modulation, it is necessary to have the ability to form a high resolution image relative to the resolution before segmentation modulation. For example, where segmentation modulation is 1/16 (one pixel is modulated to 16 bits), a resolution of 16 times the resolution prior to segmentation modulation is necessary. In order to realize this, it is necessary to greatly increase the number of beams of a semiconductor laser, the number of revolutions of a drive motor of a polygonal mirror, the number of faces of the polygonal mirror, or the like. This results in increased costs for the image forming apparatus.

SUMMARY OF THE INVENTION

An aspect of the present invention is to eliminate the above-mentioned conventional problems.

Another aspect of the present invention is to provide an image forming apparatus capable of appropriately correcting the scaling of an image in a sub-scanning direction, and a control method thereof.

According to an aspect of the present invention, there is provided an image forming apparatus, comprising:

a scaling correction unit configured to correct scaling in a sub-scanning direction of image data according to scaling data;

a screen processing unit configured to, of image data whose scaling in the sub-scanning direction has been corrected by the scaling correction unit, perform screen processing on image data included in a screen area; and an image forming unit configured to form an image based on the image data that has been processed by the screen processing unit, wherein the scaling correction unit deletes or inserts one main scanning line of image data according to the scaling data.

According to another aspect of the present invention, there is provided a method for controlling an image forming apparatus that forms an image based on image data, comprising:

a scaling correction step of correcting scaling in a sub-scanning direction of image data scaling according to scaling data;

a screen processing step of performing screen processing on, of the image data whose scaling in the sub-scanning direction has been corrected in the scaling correction step, image data included in a screen area; and an image forming step of forming an image based on the image data that has been processed in the screen processing step, wherein in the scaling correction step, one main scanning line of image data is deleted or inserted according to the scaling data.

Further features and aspects of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 depicts a view illustrating an example of processing in this exemplary embodiment, in which image deterioration in the screen area as shown in FIG. 4 is prevented.

DESCRIPTION OF THE EMBODIMENTS

Numerous embodiments of the present invention will now herein be described below in detail with reference to the accompanying drawings. The following embodiments are not intended to limit the claims of the present invention.

Figure 1:
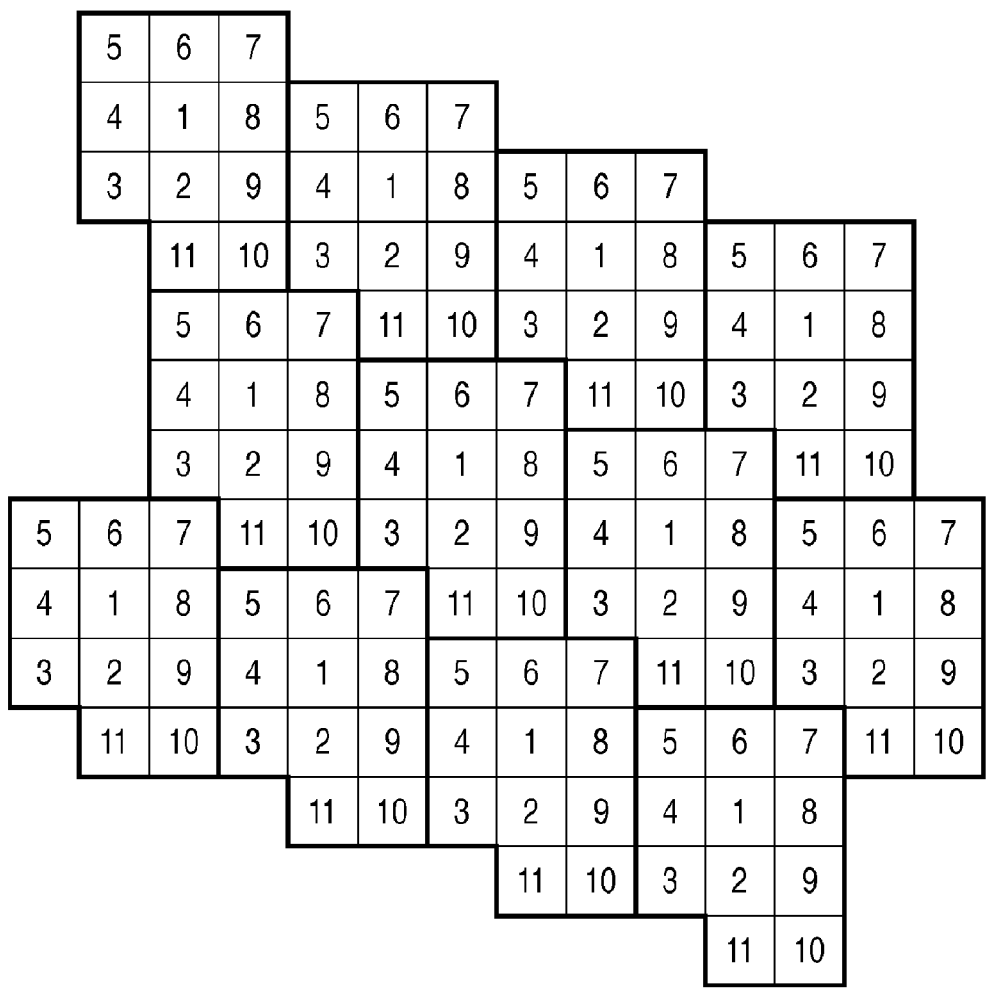
FIG. 1 is a concept diagram that shows an example configuration of an image signal processed by scaling correction processing in the sub-scanning direction according to an exemplary embodiment of the invention.

FIG. 1 is a concept diagram that shows an example configuration of an image signal processed by scaling correction processing in the sub-scanning direction according to an exemplary embodiment of the invention.

In FIG. 1, each lattice indicates one pixel, the lateral direction is the longitudinal direction of a photosensitive drum and indicates a main scanning direction, which is the direction scanned by a laser beam, and the vertical direction indicates a sub-scanning direction, which is the direction in which the photosensitive drum rotates. Pixels from "1" to "11" enclosed by a bold line indicate one screen pixel, and are one unit. In this one screen pixel, by forming pixels in order from the pixel labeled "1" according to density information of image data, it is possible to reproduce a stable tone of density that has a fixed angle.

Figure 2:
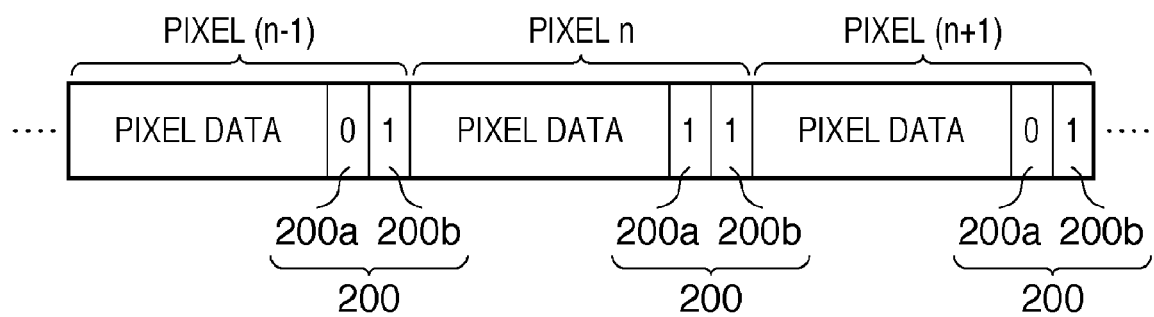
FIG. 2 depicts a view illustrating an example of configuration of pixel data that includes attribute data according to the exemplary embodiment.

FIG. 2 depicts a view illustrating an example of configuration of pixel data that includes attribute data according to the exemplary embodiment.

Here, a two bit unit of data 200 is provided to each unit of pixel data, and this two bit unit of data includes a one bit on-off unit of data 200a and a one bit unit of attribute data 200b. Here, the on/off unit of data 200a indicates whether that pixel is formed (1=on) or is not formed (0=off). Also, the one bit unit of attribute data 200b indicates whether that pixel is in the screen area (=1) or is not in the screen area (=0).

In the example in FIG. 2, pixels (n−1) to (n+1) are shown, all of these pixels are included in the screen area, and of these pixels, only the unit of on/off data 200a for pixel n is "1", so it is understood that only pixel n is formed.

Figure 3:
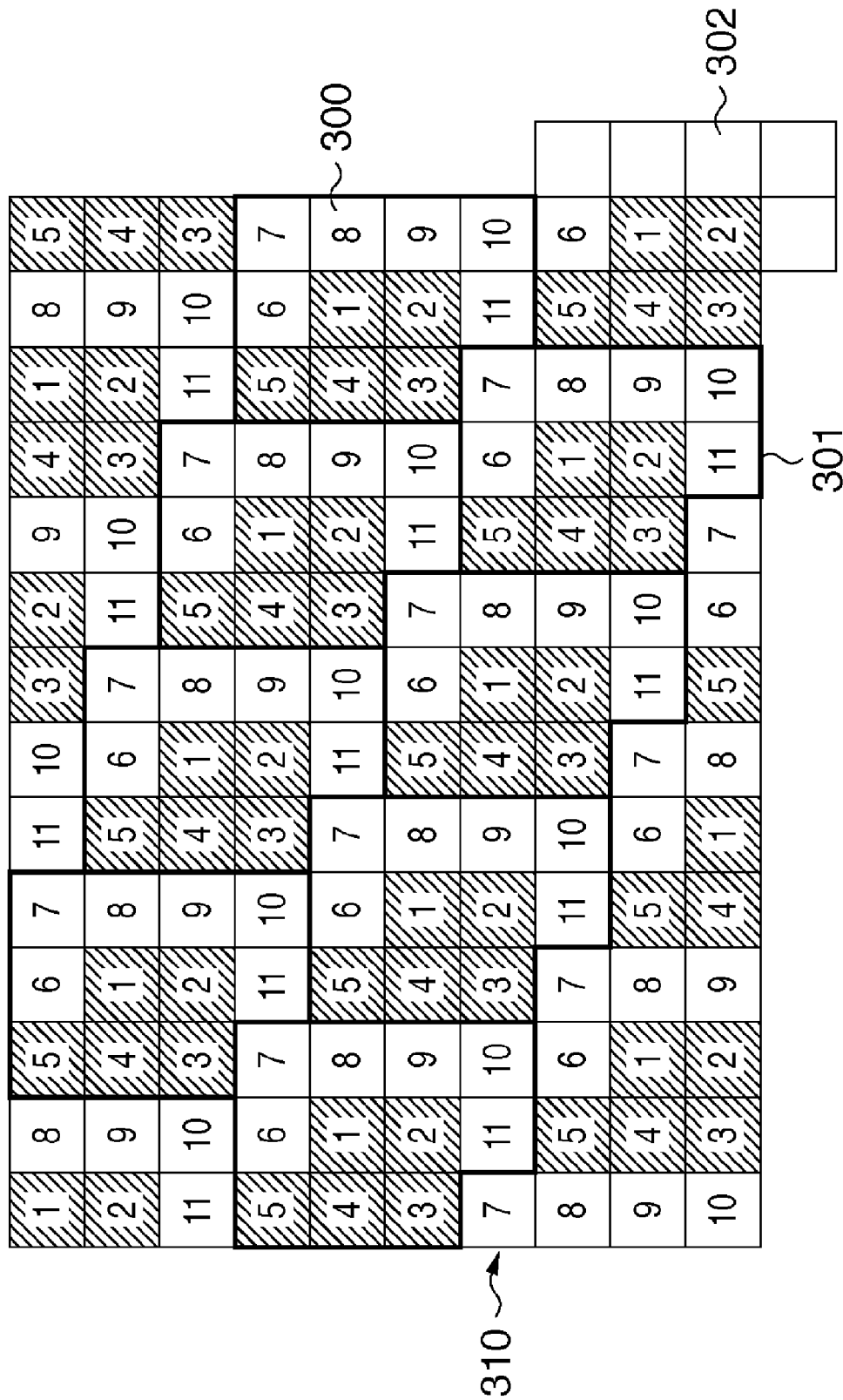
FIG. 3 depicts a view illustrating, in this exemplary embodiment, an area of 14×10 pixels included in a screen area and whose attribute data is "1".

FIG. 3 depicts a view illustrating, in this exemplary embodiment, an area of 14×10 pixels included in a screen area and whose attribute data is "1". FIG. 3 shows (a main scanning direction)×(sub-scanning direction) (14×10) area of pixels included in the screen area for which the unit of attribute data 200b is "1", and here, a case is shown where a density of 45% is expressed with a screen angle.

As shown in FIG. 3, because the density of each screen pixel is 45%, among the pixels provided with numbers "1" to "11", the pixels provided with numbers "1" to "5" are formed (printed) (in FIG. 3, the formed pixels are indicated with crosshatching).

Here, when the size of this image area is reduced by predetermined scaling data to (a main scanning direction)×(sub-scanning direction)(14×9) area of pixels, one line in the sub-scanning direction is deleted. In the example shown in FIG. 3, the line indicated by 310 is deleted.

Figure 4:
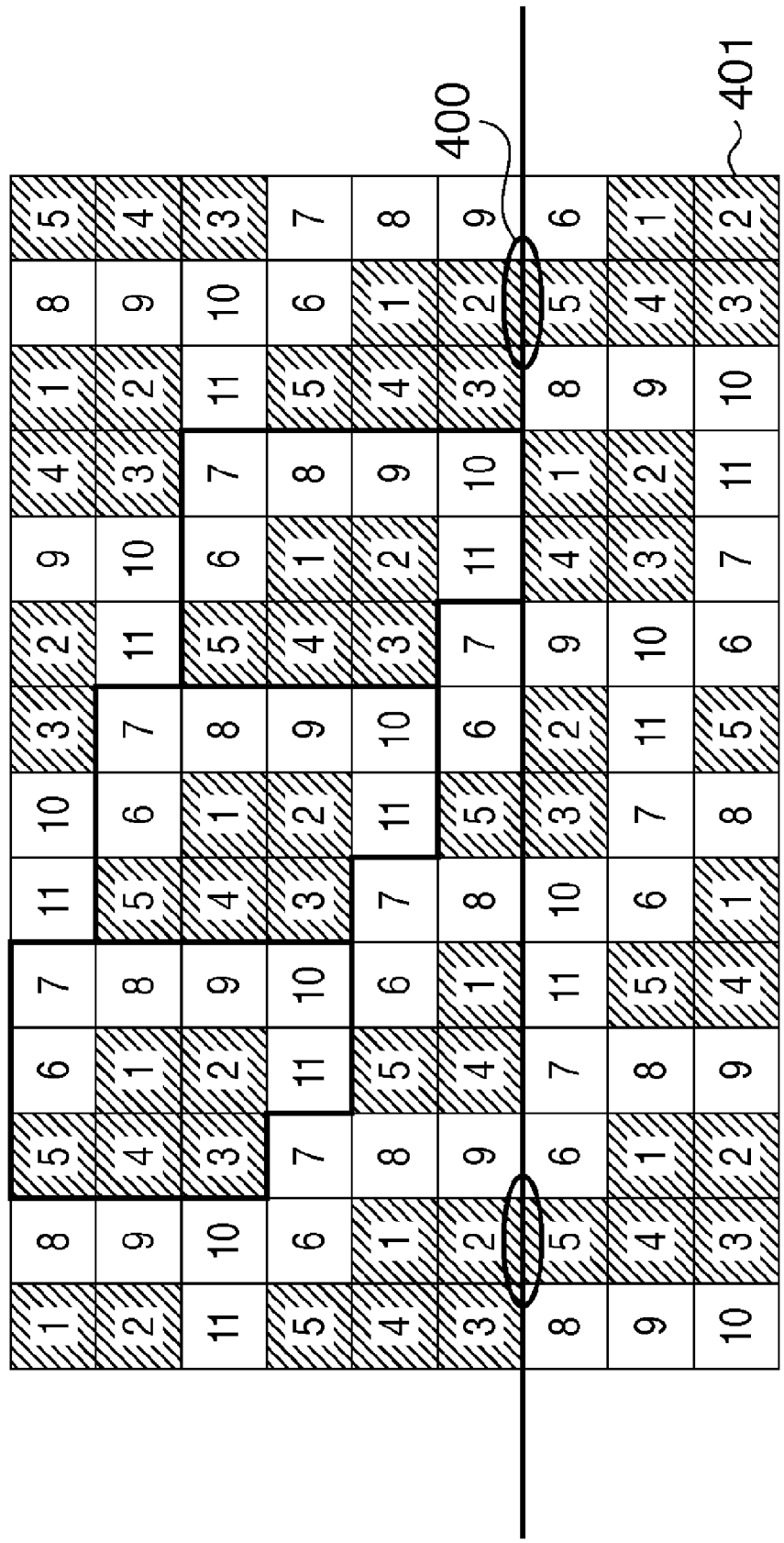
FIG. 4 depicts a view illustrating an example of an image in which one line in the sub-scanning direction has been deleted from FIG. 3.

FIG. 4 depicts a view illustrating an example of an image in which one line 310 in the sub-scanning direction has been deleted from FIG. 3.

In FIG. 4, as indicated by ellipse 400, the line that includes the pixels numbered "10" and "11" of the screen pixel 300 in FIG. 3 (for example, the line that includes the lowermost line of the screen pixel 300 and the uppermost line of the screen pixel 301 in FIG. 3) is eliminated. Thus, the pixel numbered "2" of the screen pixel 300, and the pixel numbered "5" of the screen pixel 302 below, are joined (indicated by 400 in FIG. 4). Thus, in comparison to a case where an originally white pixel ("11") has been sandwiched, the darkness of that portion increases. Also, discontinuity of the screen occurs at the position of the deleted line 310 in FIG. 3. For these reasons, the position of the deleted line 310 is displayed as a streak on the image, resulting in deterioration in image quality.

FIG. 5 depicts a view illustrating an example in which image deterioration in the screen area as shown in FIG. 4 is prevented.

As shown in FIG. 5, in a case where, for example, the reduced area becomes 14×9, screen processing is performed after determining a correction area of the image according to predetermined scaling data. That is, the last line (401 in FIG. 4) in the sub-scanning direction of the screen area is deleted, and the aforementioned deleted line 310 is left remaining as-is. Thus, the pixels of the screen area that includes this deleted line 310 are saved. Therefore, the screen angle is not disturbed, so is possible to prevent the occurrence of image defects.

Figure 6:
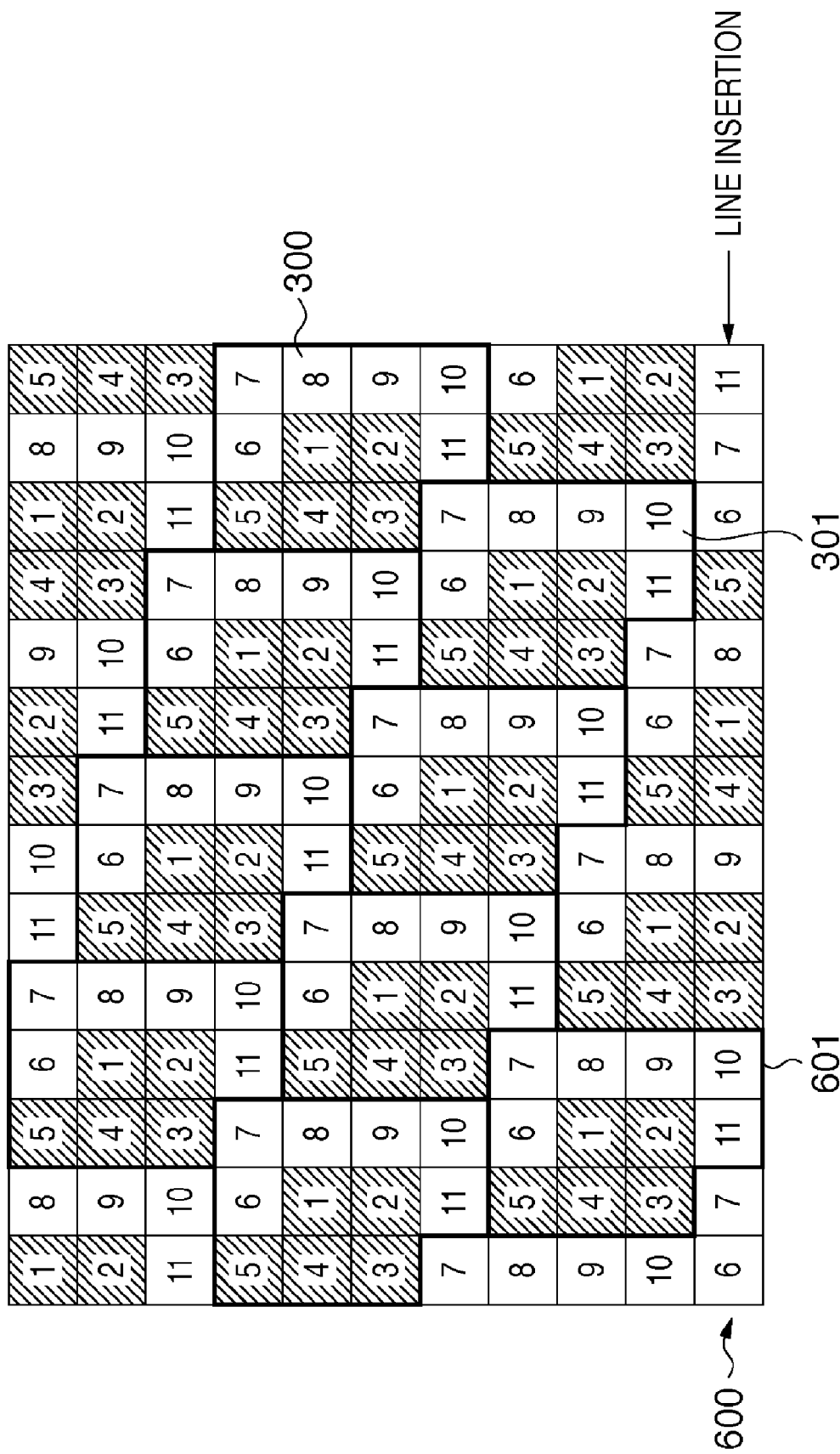
FIG. 6 shows depicts a view illustrating an area of pixels in which the 14×10 screen area in FIG. 3 is enlarged to 14×11.

FIG. 6 depicts a view illustrating a pixel area in which the 14×10 screen area in FIG. 3 has been enlarged to 14×11. The portions shared with FIG. 3 are indicated with the same reference numerals.

In the example in FIG. 6, one line indicated by reference numeral 600 is added at the end of the pixel area shown in FIG. 3. Furthermore, in this line 600, the arrangement of each pixel in the screen area (for example, 601) that includes this line is kept the same as the arrangement of other pixels in that screen area.

Note that in the above exemplary embodiment, the position of deletion or insertion of one line of image data is the last line of the screen area. However, this is not a limitation of the invention. For example, a configuration may be adopted in which the position of deletion or insertion of one line of image data is appropriately modified such that the arrangement of pixels in the screen area after scaling has changed becomes the arrangement of pixels of image data before correcting scaling.

Figure 7:
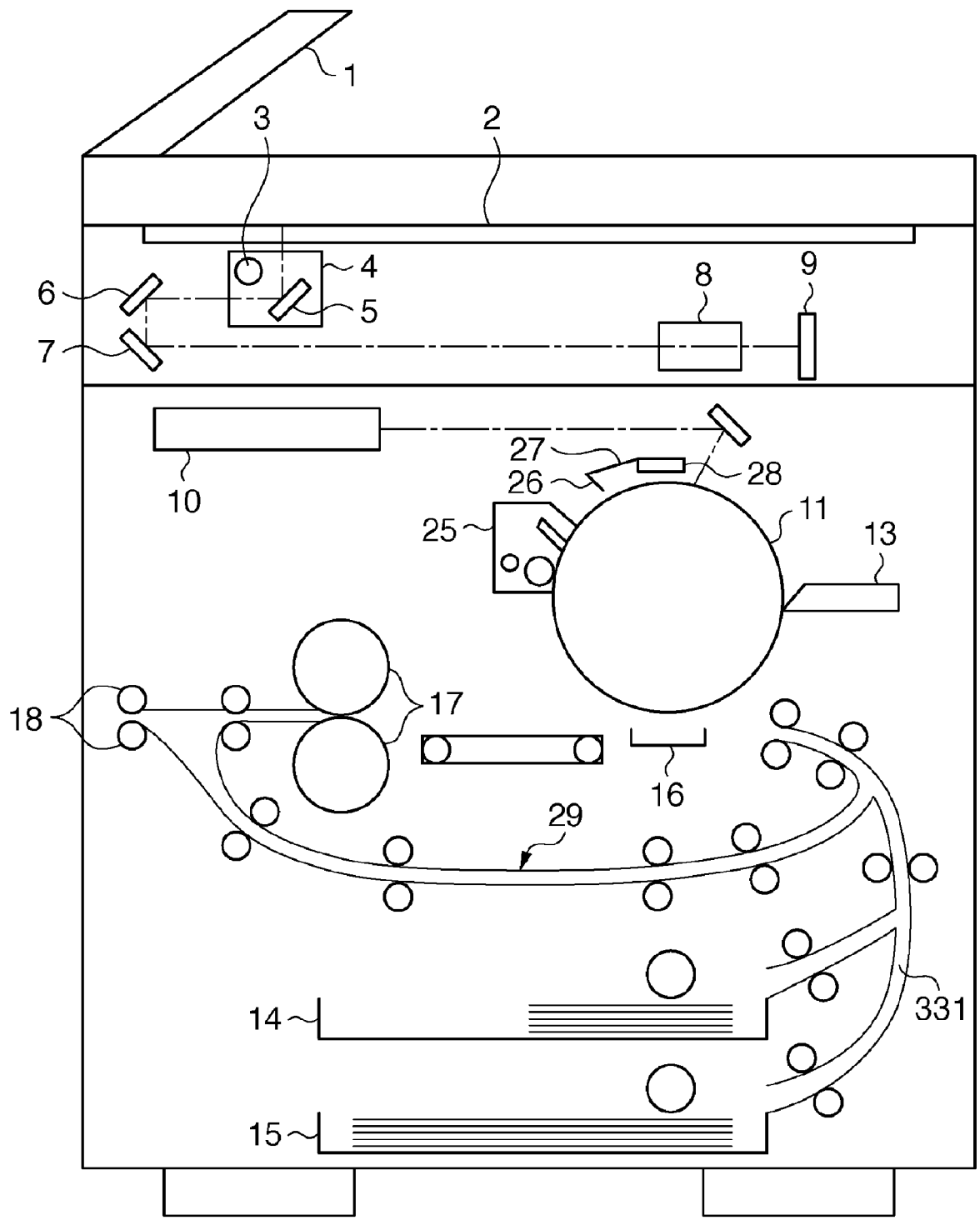
FIG. 7 depicts a view illustrating the configuration of a copy machine according to this exemplary embodiment.

FIG. 7 depicts a view illustrating the configuration of a copy machine according to this exemplary embodiment.

This copy machine is provided with a document feeder 1 in which a plurality of sheets of originals can be stacked and a scanner unit 4 configured to be capable of moving in the sub-scanning direction (right and left directions in FIG. 7). The document feeder 1 transports each of the stacked plurality of sheets of originals sheet by sheet from the bottom of the originals onto a platen glass 2. The scanner unit 4 is equipped with a lamp 3 for illuminating an original that has been transported onto the platen glass 2, and a reflecting mirror 5 for guiding reflected light from the original on the platen glass 2 to a reflecting mirror 6. The reflecting mirror 6 guides reflected light from the reflecting mirror 5 to a lens 8 in cooperation with a reflecting mirror 7, and the lens 8 forms this reflected light as an image on an image sensor 9. The image sensor 9 converts the formed optical image to an electrical signal, and after predetermined processing has been performed on this electrical signal, the electrical signal is supplied as an image signal to an exposure controller 10.

The exposure controller 10 emits laser light according to the supplied image signal, and exposes/scans the surface of a photosensitive drum 11 with this laser light. Due to exposure/scanning with this laser light, an electrostatic latent image corresponding to the laser light is formed on the photosensitive drum 11. The latent image formed on the photosensitive drum 11 is made visible as a toner image by toner supplied from a developer 13.

Also, at a timing synchronized with the start of irradiation of this laser light, a transfer paper (sheet) is supplied from a cassette 14 or a cassette 15, and this sheet is transported toward a transfer unit 16 via a transport path 331. The toner image on the photosensitive drum 11 is transferred onto the transported sheet by the transfer unit 16. The sheet onto which a toner image has been transferred in this manner is conveyed to a fixing unit 17. With the fixing unit 17, heat and pressure are applied to the toner image on the sheet, thus fixing the toner image on the sheet.

After the toner image has been transferred to a sheet, the surface of the photosensitive drum 11 is cleaned with a cleaner 25, and then neutralized with an auxiliary charger 26. Then, a residual electric charge of the surface of the photosensitive drum 11 is removed with a pre-exposure lamp 27 to establish a state in which an ideal electric charge is obtained with a primary charger 28, after which the surface of the photosensitive drum 11 is again charged with the primary charger 28.

With the image forming apparatus according to this exemplary embodiment, a path for double-sided printing 29 that enables double-sided printing is provided. A sheet that has passed through the fixing unit 17 is guided to a pair of discharge rollers 18 and discharged to the outside, but when performing double-sided printing, while discharge of the sheet is not complete, rotation of the discharge rollers 18 is reversed and the sheet is guided to the path 29 for double-sided printing. Thus, the sheet is again transported to the transfer unit 16 via the path 29 for double-sided printing. At this time, the face of the sheet that faces the photosensitive drum 11 is the back face, and same as in the case described above, the back face image that has been formed on the photosensitive drum 11 is transferred onto the sheet. Then, once again, fixing is performed by the fixing unit 17, and the sheet on which double-sided printing has been performed is discharged outside of the apparatus by rotation of the discharge roller 18.

Ordinarily, a sheet includes moisture, and when fixing is performed on the sheet by the fixing unit 17, the moisture included in the sheet evaporates due to heat applied by the fixing unit 17. Thus, the amount of moisture contained in the sheet is reduced, so the size of the sheet ordinarily is reduced by a ratio of up to 1%. Note that depending on the type of sheet, the sheet may also be enlarged by up to 1%.

Due to this phenomenon, after fixing of the image that has been formed on the surface of the sheet, enlargement of that sheet occurs. Also note that in a case where, in a state in which the sheet has expanded or contracted, an image will be formed on the back face of that sheet, the image is formed with a scaling obtained by correcting, using a predetermined scaling correction value that matches this sheet expansion or contraction, the scaling of the image that has been formed on the front face of that sheet. Thus, it is possible to form an image on the back face with a scaling that matches the size of the image that has been formed on the front face. That is, after an image is fixed on the back face of the sheet, when the temperature of that sheet returns to a normal temperature, the amount of moisture in that sheet also returns, and thus the size of that sheet also returns to its original size. Because at this time the image formed on the back face returns to the original size, the image on the back face also is formed with the same size as the size of the image on the front face of the sheet.

Figure 8:
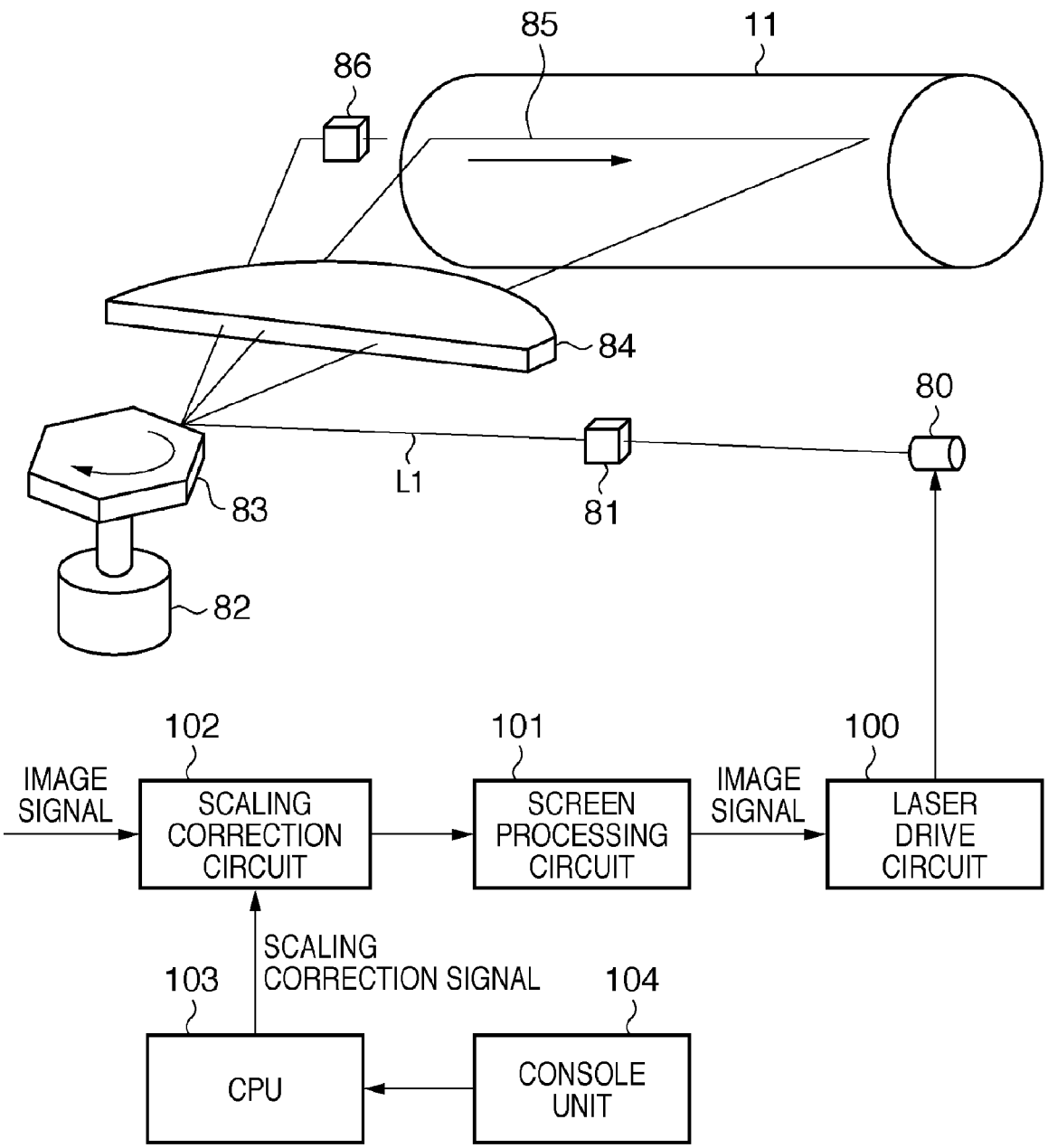
FIG. 8 schematically depicts a view illustrating the configuration of an exposure control unit of the copy machine according to an exemplary embodiment of the invention.

FIG. 8 depicts a view illustrating the schematic configuration of the exposure controller 10 of the copy machine according to this exemplary embodiment of the invention.

An exposure unit is provided that irradiates laser light to the photosensitive drum 11, such that an electrostatic latent image that corresponds to input image data that has been input is formed on the photosensitive drum 11. The exposure unit is provided with a laser light source 80 that emits laser light. The laser light emitted from the laser light source 80 is converted to a parallel laser light L1 via a collimator lens 81. The laser light L1 is irradiated to a polygonal mirror 83 that is rotationally driven by a scanner motor 82. The laser light L1 irradiated to the polygonal mirror 83 is reflected by the polygonal mirror 83 and arrives at a f-θ lens 84. Laser light that has passed through this f-θ lens 84 is coupled/scanned at a uniform speed in the main scanning direction on the photosensitive drum 11, and due to this laser light scanning, that is, due to a scan operation, a latent image 85 is formed on the photosensitive drum 11. Starting of the laser light scan operation is detected by a beam detector 86. When starting scanning of laser light on the photosensitive drum 11, the laser light source 80 is forcibly lighted. The beam detector 86 detects laser light that has been reflected and input by the polygonal mirror 83 during the period in which the laser light source 80 is forcibly lighted, and outputs a beam detection signal (referred to below as a BD signal), which is a reference signal for image forming write timing of each main scan. The above configuration corresponds to an image forming unit.

Scaling correction and screen processing have been performed on the image data that is input at this time.

This operation will be described beginning from image forming processing to the front face of a sheet.

An image signal from a controller (not shown) is input to a scaling correction circuit 102. Scaling data is input from a CPU 103 to the scaling correction circuit 102. When forming an image on the front face of a sheet, the CPU 103 inputs scaling data indicating that the scaling is 100% to the scaling correction circuit 102. The scaling correction circuit 102 enlarges or reduces the size of the image as described above with reference to FIGS. 3 to 6. Then, an image signal output from the scaling correction circuit 102 is input to a screen processing circuit 101. The screen processing circuit 101 determines the value of attribute data, and performs screen processing on the screen area. The image signal output from the screen processing circuit 101 is input to a laser driving circuit 100. The laser driving circuit 100 drives the laser light source 80 according to the input image signal.

Next is a description of processing in a case where an image is formed on the back face of a sheet.

An image signal from the controller (not shown) is input to the scaling correction circuit 102. Scaling data is input from the CPU 103 to the scaling correction circuit 102. Here, the corrected scaling in a case where an image is formed on the back face of a sheet is input by an operator from a console unit 104 based on a reduction ratio of the sheet due to the fixing of image on the front face of the sheet. The input data from the console unit 104 is determined by the CPU 103, and input to the scaling correction circuit 102 as scaling data. Thus, the scaling correction circuit 102 performs scaling correction processing on the input image signal, and the image signal whose scaling has been corrected is input to the screen processing circuit 101. The screen processing circuit 101 determines attribute data, and performs screen processing on the screen area. The image signal output from the screen processing circuit 101 is input to the laser driving circuit 100. The laser driving circuit 100 drives the laser light source 80 according to the image signal input in this manner, thus forming an image.

Figure 9:
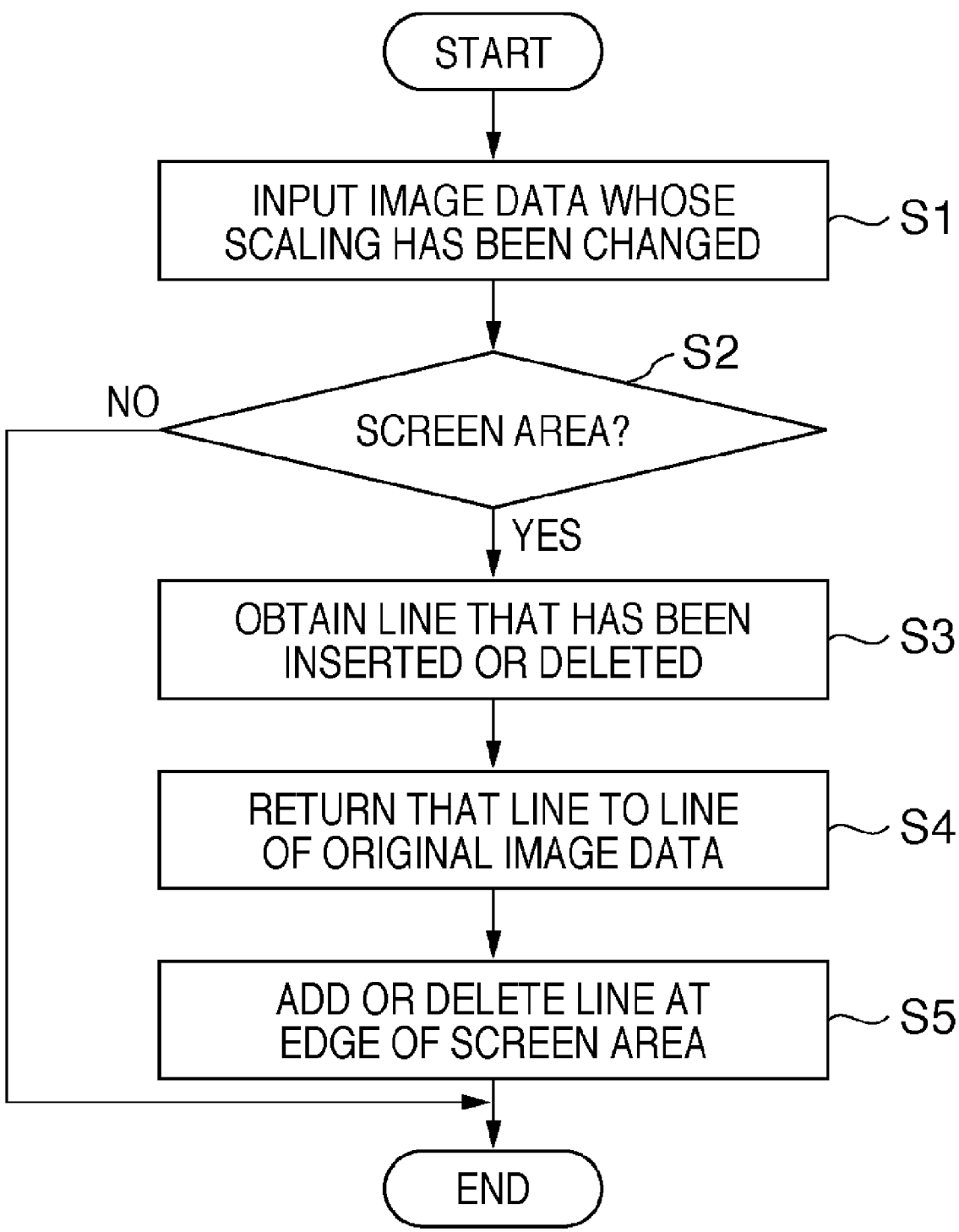
FIG. 9 is a flowchart describing the flow of processing by a scaling correction circuit according to this exemplary embodiment.

FIG. 9 is a flowchart explaining the flow of processing by the scaling correction circuit 102 according to this exemplary embodiment.

Here, first, in step S1, image data for one page for which the scaling has been modified by the scaling correction circuit 102 is input. Then, in step S2, pixel data included in the screen area is obtained. This pixel data is obtained by extracting the pixel data for which the above-described attribute data is "1". In the case of pixel data that is not included in the screen area (pixel data whose attribute data is "0"), processing is ended without doing anything in particular. In step S2, in a case where the pixel data is determined to be included in the screen area, the processing proceeds to step S3, a line in which line data has been inserted or deleted in the image data for one page for which the scaling has been modified by the scaling correction circuit 102 is obtained. This is determined based on information from the scaling correction circuit 102. Next the processing proceeds to step S4, and that deleted or inserted line is returned to the original image data state. Next the processing advances to step S5, and in a case where a line is to be deleted, line data positioned at the edge of that screen area is deleted. On the other hand, in a case where a line is to be inserted, new line data is inserted after the last line of that screen area. That is, in a case where a deleted line has been returned to the original image data state in step S4, the line data positioned at the edge is deleted in step S5.

In this manner image data whose scaling has been modified is produced, and then sent to the screen processing circuit 101, where screen processing is performed on this image data.

Thus, the pixel arrangement in that screen area is maintained, so disturbances in the screen angle or the like do not occur.

While maintaining scaling that has been converted in this way, it is possible to prevent disturbances in the screen angle or discontinuity of the image.

According to the exemplary embodiment as described above, image contraction or expansion is performed by deleting or adding main scanning line data based on scaling data for the sub-scanning direction. Also, by providing attribute data for indicating that the image data is included in the screen processing area to the image data, the screen processing area is clearly indicated, and screen processing is performed on the screen processing area after image contraction or expansion processing has been performed by deleting or adding main scanning line data. Thus it is possible to prevent discontinuity in an image due to deleting or adding a main scanning line, and it is possible to suppress negative effects such as the occurrence of streaks or the like in the image.

Also, in the exemplary embodiment described above, a case was described where a semiconductor laser that exposes an image emits a single instance of laser light, but the invention is also applicable to a case where a semiconductor laser is employed that is capable of emitting a plurality of instances of laser light. A semiconductor laser capable of emitting a plurality of instances of laser light, in particular, simultaneously exposes a plurality of lines in parallel by scanning once using a rotating polygonal mirror. In this case, the resolution of the image in the sub-scanning direction is fixed, so the configuration for enlarging or reducing the size of the image in the sub-scanning direction according to the exemplary embodiment described above is very important.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2007-148617, filed Jun. 4, 2007, which is hereby incorporated by reference herein in its entirety.

What is claimed is:

1. An image forming apparatus, comprising:
a scaling correction unit configured to correct scaling in a sub-scanning direction of image data according to scaling data at least by deleting or inserting one main scanning line of image data according to the scaling data;
an identifying unit configured to identify a screen area within the image data, wherein the scaling correction unit is configured to undo the deleting or inserting of the one main scanning line within the screen area and then re-correct scaling in the sub-scanning direction within the screen area at least by deleting or inserting another main scanning line at a different position within the screen area;
a screen processing unit configured to, of image data whose scaling in the sub-scanning direction has been corrected or re-corrected by the scaling correction unit, perform screen processing on image data included in the screen area; and
an image forming unit configured to form an image based on the image data that has been processed by the screen processing unit.

2. The apparatus according to claim 1, wherein the different position within the screen area is defined as an edge of the screen area.

3. The apparatus according to claim 1, further comprising an input unit configured to input the scaling data.

4. The apparatus according to claim 1, wherein the screen area represents a subset of the image data, wherein the scaling correction unit is configured to perform the undo and re-correct within the subset of the image data, but not in another area of the image data outside of the subset of the image data.

5. A method for controlling an image forming apparatus that forms an image based on image data, comprising:
a scaling correction step of correcting scaling in a sub-scanning direction of image data scaling according to scaling data at least by deleting or inserting one main scanning line of image data according to the scaling data;
an identifying step of identifying a screen area within the image data, wherein the scaling correction step includes undoing the deleting or inserting of the one main scanning line within the screen area and then re-correcting scaling in the sub-scanning direction within the screen area at least by deleting or inserting another main scanning line at a different position within the screen area;
a screen processing step of performing screen processing on, of the image data whose scaling in the sub-scanning direction has been corrected or re-corrected in the scaling correction step, image data included in the screen area; and
an image forming step of forming an image based on the image data that has been processed in the screen processing step.

6. The method according to claim 5, wherein the different position within the screen area is defined as an edge of the screen area.

7. The method according to claim 5, wherein the screen area represents a subset of the image data, wherein the scaling correction step includes performing the undo and re-correct within the subset of the image data, but not in another area of the image data outside of the subset of the image data.

8. An image forming apparatus comprising:
a computer system comprising a computer;
a memory system comprising a memory device, the memory system connected to the computer system, and at least the memory device storing instructions executable at least by the computer, the instructions comprising instructions for:
a scaling correction step of correcting scaling in a sub-scanning direction of image data scaling according to scaling data at least by deleting or inserting one main scanning line of image data according to the scaling data;
an identifying step of identifying a screen area within the image data, wherein the scaling correction step includes undoing the deleting or inserting of the one main scanning line within the screen area and then re-correcting scaling in the sub-scanning direction within the screen area at least by deleting or inserting another main scanning line at a different position within the screen area;
a screen processing step of performing screen processing on, of the image data whose scaling in the sub-scanning direction has been corrected or re-corrected in the scaling correction step, image data included in the screen area; and
an image forming step of forming an image based on the image data that has been processed in the screen processing step.

* * * * *